United States Patent
Nichols et al.

(10) Patent No.: US 7,519,691 B2
(45) Date of Patent: Apr. 14, 2009

(54) SELECTIVE UPDATE OF CONSOLE PARAMETERS FROM OTHER CONSOLES

(75) Inventors: Stephen R. Nichols, Endicott, NY (US); Kurt N. Schroeder, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 1057 days.

(21) Appl. No.: 10/728,507

(22) Filed: Dec. 4, 2003

(65) Prior Publication Data

US 2005/0144261 A1 Jun. 30, 2005

(51) Int. Cl.
*G06F 15/16* (2006.01)
*G06F 15/177* (2006.01)
*G06F 15/173* (2006.01)
*G06F 9/44* (2006.01)

(52) U.S. Cl. .................. 709/220; 709/219; 709/223; 717/171

(58) Field of Classification Search ............... 709/220, 709/219, 223; 717/171
See application file for complete search history.

(56) References Cited

U.S. PATENT DOCUMENTS

| | | | | |
|---|---|---|---|---|
| 5,684,952 A | | 11/1997 | Stein | 395/200.1 |
| 6,049,671 A | * | 4/2000 | Slivka et al. | 717/173 |
| 6,067,582 A | * | 5/2000 | Smith et al. | 710/5 |
| 6,073,214 A | * | 6/2000 | Fawcett | 711/133 |
| 6,202,207 B1 | * | 3/2001 | Donohue | 717/173 |
| 6,304,913 B1 | * | 10/2001 | Rune | 709/241 |
| 6,385,201 B1 | | 5/2002 | Iwata | 370/400 |
| 7,051,091 B1 | * | 5/2006 | Cohen et al. | 709/221 |
| 2002/0089949 A1 | | 7/2002 | Bjelland et al. | 370/331 |
| 2003/0046676 A1 | * | 3/2003 | Cheng et al. | 717/173 |
| 2003/0097211 A1 | * | 5/2003 | Carroll et al. | 701/33 |
| 2004/0015953 A1 | * | 1/2004 | Vincent | 717/173 |

FOREIGN PATENT DOCUMENTS

WO WO03019966 A1 3/2003

* cited by examiner

*Primary Examiner*—William C Vaughn, Jr.
*Assistant Examiner*—Ranodhi N Serrao
(74) *Attorney, Agent, or Firm*—Silvy A. Murphy

(57) ABSTRACT

A system, method and program product for updating first and second parameters of a recipient computer console from first and second donor computer consoles. The recipient console registers with the first donor console to receive notification when the first donor console has an update to the first parameter. The recipient console registers with the second donor console to receive notification when the second donor console has an update to the second parameter. After registering the recipient console with the first donor console, the recipient console receives the notification from the first donor console and updates the first parameter from the first donor console accordingly. After registering the recipient console with the second donor console, the recipient console receives notification from the second donor console and updates the second parameter from the second donor console accordingly. The parameters can be a help desk phone number, an identity of an authorized user or an authorization of a user.

6 Claims, 7 Drawing Sheets

SELECTIVE UPDATE OF CONSOLE PARAMETERS FROM OTHER CONSOLES

BACKGROUND OF THE INVENTION

The invention relates generally to computer systems, and deals more particularly with updating parameters for computer consoles and other computer devices.

Computer servers and clusters of computer servers are well known today. Typically, there is a console for each server or cluster of servers to control the servers. The console may comprise a computer workstation with server control software and a user interface to enter commands to control the servers. The control functions for the servers include power-on, power-off, IML, IPL, scheduled operations, change management to the server software, and configuration of the servers. There are also parameters associated with the server(s) or console: user IDs and passwords of the console operators, groupings of servers managed by the console, account information, default settings for the displays, a help desk telephone number for the console operator, a language designation for text on the screens, IP address of the console, IP address of each server managed by the console, etc. These parameters are stored in the console for operation or display as needed. It is often needed that some of the parameters, such as account information, server grouping information, help desk telephone number, user ID and passwords, user permissions, and default settings are maintained the same at different consoles.

In some environments, there are multiple clusters of servers at different geographic locations, with one or more control console for each cluster. The consoles may include the same server control software and may control similar types of servers. Therefore, the consoles may need the same software updates as they become available. However, not all the consoles will need the same parameters. For example, the operators of some consoles may use a different help desk telephone number and speak a different language than operators of other consoles. Likewise, some consoles may have different default settings and account information than other consoles. The parameters for each of the consoles and their respective servers can be entered manually by an operator one-by-one into the console. Alternately, an operator at one console could save the parameters to removable media, such as a diskette, and then deliver the disk to another console where it was loaded in. Some of the parameters occasionally change. While these techniques for entering the parameters are effective, they are labor intensive and prone to human error.

Accordingly, an object of the present invention is to improve the process of loading the proper parameters in each console.

SUMMARY

The invention resides in a system, method and program product for updating first and second parameters of a recipient computer console from first and second donor computer consoles. The recipient console registers with the first donor console to receive notification when the first donor console has an update to the first parameter. The recipient console registers with the second donor console to receive notification when the second donor console has an update to the second parameter. After registering the recipient console with the first donor console, the recipient console receives the notification from the first donor console and updates the first parameter from the first donor console accordingly. After registering the recipient console with the second donor console, the recipient console receives notification from the second donor console and updates the second parameter from the second donor console accordingly.

According to another feature of the present invention, a second recipient console registers with the first donor console to receive notification when the first donor console has an update to the first parameter. After the step of registering the second recipient console with the first donor console, the second recipient console receives the notification from the first donor console and updates the first parameter from the first donor console accordingly.

According to other features of the present invention, the parameters can be a help desk phone number, an identity of an authorized user or an authorization of a user.

DETAILED DESCRIPTION OF THE PREFERRED EMBODIMENTS

Figure 1:
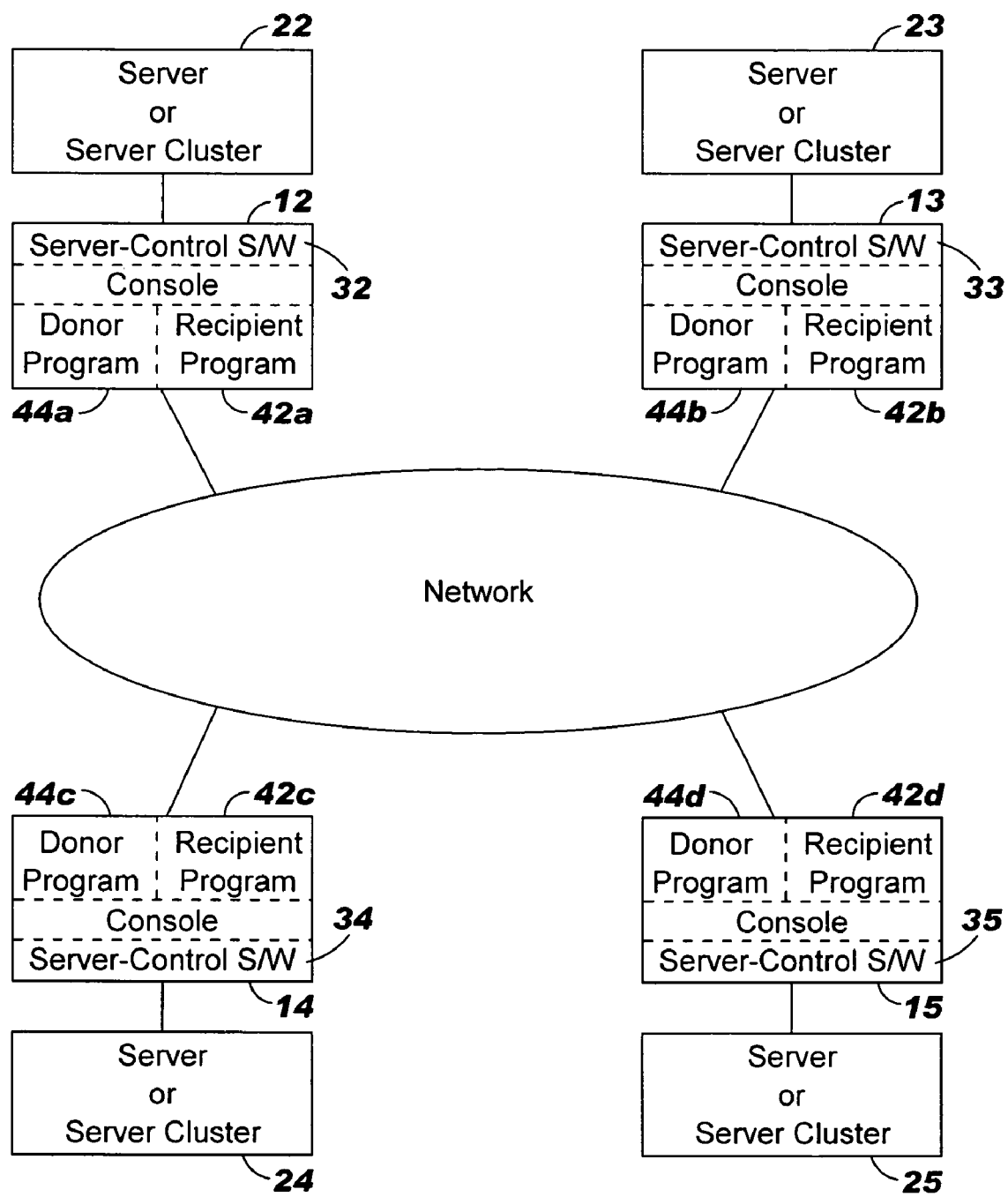
FIG. 1 is a block diagram of a computer system which includes the present invention.

One or more embodiments of the present invention will now be described in detail with reference to the drawings, wherein like reference numbers indicate like elements throughout. FIG. 1 illustrates a computer system generally designated 10 which includes the present invention. Computer system 10 illustrates consoles 12, 13, 14 and 15 for respective servers or clusters or servers 22, 23, 24 and 25. Each of the consoles 12, 13, 14 and 15 has similar server control software 32, 33, 34 and 35 such as IBM Hardware Management Console software. The server control software provides the following control functions for their respective servers or clusters of servers: power-on, power-off, IML, IPL, scheduled operations, change management to the server software, and configuration of the servers. Each of the consoles 12, 13, 14 and 15 is coupled to each other via a network 37, such as the Internet, Ethernet or Token Ring.

Each of the consoles 12-15 also stores and uses various parameters such as user IDs, authorizations for each user ID, passwords of the console operator, groupings of servers managed by the console, account information, default settings for the displays, a help desk telephone number for the console operator, a phone number for remote connectivity to download changes to software, a language designation for text on the screens, an IP address for the console, IP address of each server managed by the console, "owner" of server, activation profile of servers or logical partitions of server (ex. amount of memory and share of processor), etc. Some of the parameters need to be maintained the same for different consoles. Other parameter values can be different for different consoles. In accordance with the present invention, each console 12, 13, 14 and 15 includes a respective parameter replication recipient program 42*a,b,c* and *d* (generically referenced as "42"), and a respective parameter replication donor program 44*a,b,c* and *d* (generically referenced as "44"). With these programs, for each parameter, each "recipient" console can identify a specific "donor" console from which to replicate that parameter. Each console can specify different consoles from which to replicate different, respective parameters. The replications occur automatically after registration. Each console can server as both a recipient console and a donor console for different parameters, or serve only as a donor console or a recipient console. (Typically, the donor consoles will receive their parameters through a prior art technique such as manual loading of the parameters one-by-one or loading of a disk which contains some or all the parameters.)

The overall process flow is as follows. The recipient console decides which parameters to replicate from which donor console(s). This decision is typically made by an operator and will be recorded in a configuration file of the recipient console. The recipient console will then register with each of its donor consoles for updates to the respective parameter(s) selected by the recipient console for replication from the donor console. During registration, each donor console notifies the registering recipient console as to the current level, if any, of the parameters requested by the recipient console. If the donor console has a more recent level of the specified parameter(s), the donor console furnishes it to the recipient console upon registration. Subsequently, when the donor console obtains updates to the specified parameters, it notifies the recipient consoles who have registered for updates to this parameter. Then, the recipient consoles can request download of the updated parameters.

The following is an example of a system where the following recipient consoles have registered for updates for specific parameters from specific donor consoles:

TABLE A

| Recipient Console | Parameter | Level | Donor Console |
|---|---|---|---|
| console 12 | help desk phone # | Jun. 20, 2003 | console 14 |
| console 12 | grouping of servers | Jul. 01, 2003 | console 14 |
| console 12 | default settings | Aug. 15, 2003 | console 13 |

TABLE B

| Recipient Console | Parameter | Level | Donor Console |
|---|---|---|---|
| console 13 | help desk phone # | Sep. 15, 2003 | console 15 |
| console 13 | grouping of servers | Jul. 01, 2003 | console 14 |

TABLE C

| Recipient Console | Parameter | Level | Donor Console |
|---|---|---|---|
| console 15 | grouping of servers | Jul. 01, 2003 | console 14 |
| console 15 | default settings | Aug. 15, 2003 | console 13 |

Figure 2:
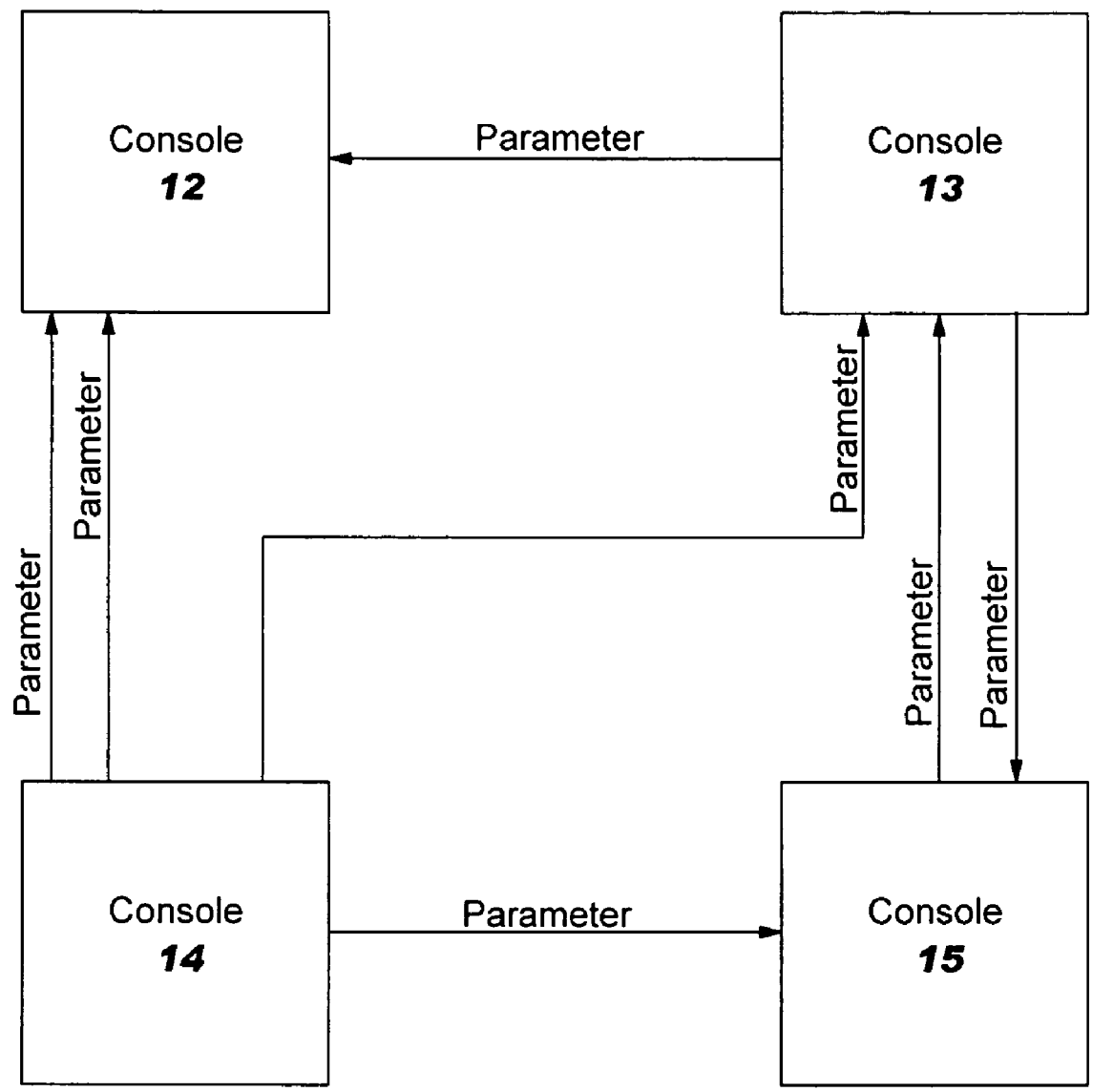
FIG. 2 is a block diagram illustrating consoles of the system of FIG. 1, and an example of which parameters of each console are updated from which other console.

FIG. 2 also illustrates this example. In this example, console 12 has registered to receive updates for the help desk phone # parameter from console 14, for the groupings of servers parameter from console 14, and for the default settings parameter from console 13. Console 12 is a recipient console only. Console 13 has registered to receive updates for the help desk phone # parameter from console 15 and for the grouping of servers parameter from console 14. Console 13 is both a recipient console and a donor console. Console 14 is a donor console only, and therefore has not registered to receive any parameter updates from any other console. Console 14 receives its parameters by manual entry or manual loading from removable media, such as a diskette. Console 15 has registered to receive updates for the grouping of servers parameter from console 14 and for the default settings parameter from console 13. Console 15 is both a recipient console and a donor console. The information of Table A is recorded in a configuration file in console 12, the information of Table B is recorded in a configuration file in console 13 and the information of Table C is recorded in a configuration file in console 15. There is no need for such a "recipient" table in a configuration file in console 14 because console 14 is a donor console only. Each of the donor consoles includes corresponding registration information in its configuration file, indicating which recipient consoles have registered for updates to which parameter(s) from the donor console. In the foregoing example, the corresponding registration information in each donor console would be as follows, although the level of each parameter may be different as indicated below:

TABLE D

| Donor Console | Parameter | Level | Recipient Console |
|---|---|---|---|
| console 13 | default settings | Aug. 15, 2003 | console 12 |
| console 13 | default settings | Aug. 15, 2003 | console 15 |

TABLE E

| Donor Console | Parameter | Level | Recipient Console |
|---|---|---|---|
| console 14 | help desk phone # | Aug. 10, 2003 | console 12 |
| console 14 | grouping of servers | Aug. 10, 2003 | console 12 |
| console 14 | grouping of servers | Aug. 10, 2003 | console 13 |
| console 14 | grouping of servers | Aug. 10, 2003 | console 15 |

TABLE F

| Donor Console | Parameter | Level | Recipient Console |
|---|---|---|---|
| console 15 | help desk phone # | Sep. 15, 2003 | console 13 |

In this example of the donor information in each donor console, the level of the donor parameters in consoles 12, 13 and 15 is the same as that in its recipient consoles, so no update is needed at this time for these parameters. However, the level of the donor parameter—grouping of servers, in donor console 14 is more recent than that of its recipient consoles 12, 13 and 15. Additionally, the level of the donor parameter—help desk phone #, in donor console 14 is more recent than that of one of its recipient consoles, console 12. So, according to the present invention as described below, donor console 14 will notify its (registered) recipient consoles 12, 13 and 14 of the availability of the update to these parameters, and thereby invite consoles 12, 13 and 14 to request the latest level of these parameters from donor console 12. Typically, consoles 12, 13 and 14 will then request and load the latest level of these parameters from donor console 12.

Figure 3:
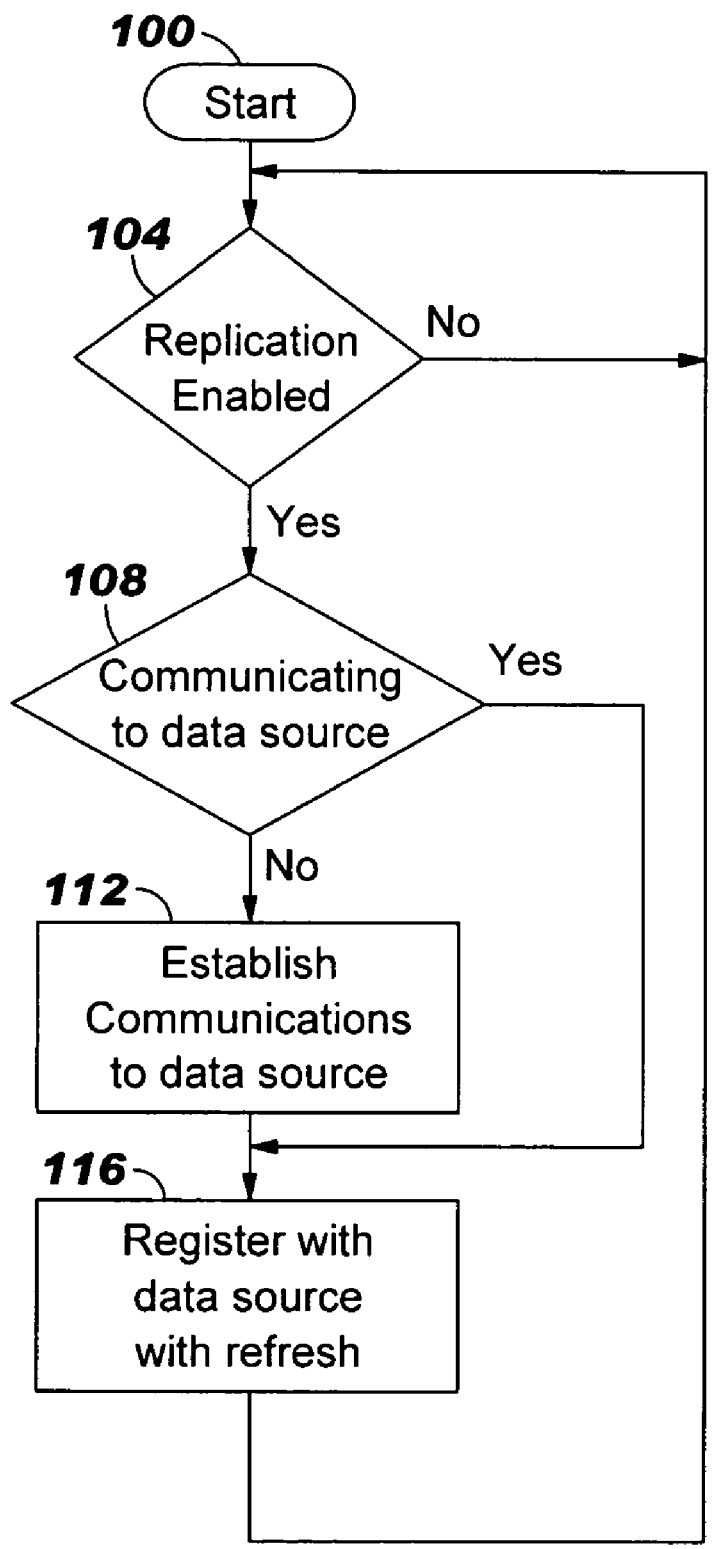
FIG. 3 is a flow chart illustrating how each recipient console establishes communication with its donor consoles of the system of FIG. 1, and requests registration for updates to specified parameters.

FIG. 3 is a flow chart illustrating how each recipient console establishes communication with its donor consoles and requests registration for updates to specified parameters. The steps of FIG. 3 are performed for each recipient console. In step 100, the parameter replication recipient program 42 in the recipient console is started. In response, the parameter replication recipient program determines from the configuration file of its console if the console has been enabled for replication (decision 104). An operator of the console previously entered the data in the configuration file (including the information of the recipient table such as Table A, B or C and an indication whether parameter replication should be enabled). If the recipient console has been enabled for parameter replication (decision 104, yes branch), then the parameter replication recipient program 42 determines from a communications manager if a communications path is currently established between its console and each of its donor consoles (decision 106). If there is not an established communications path for any of its donor consoles (decision 108, no branch), then the parameter replication program 42 requests that the communications manager establish a new communications path with this donor console(s) and then checks to make sure that communication was successfully established (step 112). When there is a communications path from the recipient console to each of its donor console(s), then the recipient console requests to register with each of its donor console(s) for updates to the parameters specified in the recipient table (step 116). The request for each donor console specifies the parameter to be updated from the donor console and whether "refresh" is requested. (As described below, the registration request also serves as a request for the donor console to respond with an identification of the current level of each of the parameters stored in the donor console for which update is requested by the recipient console.)

Figure 4:
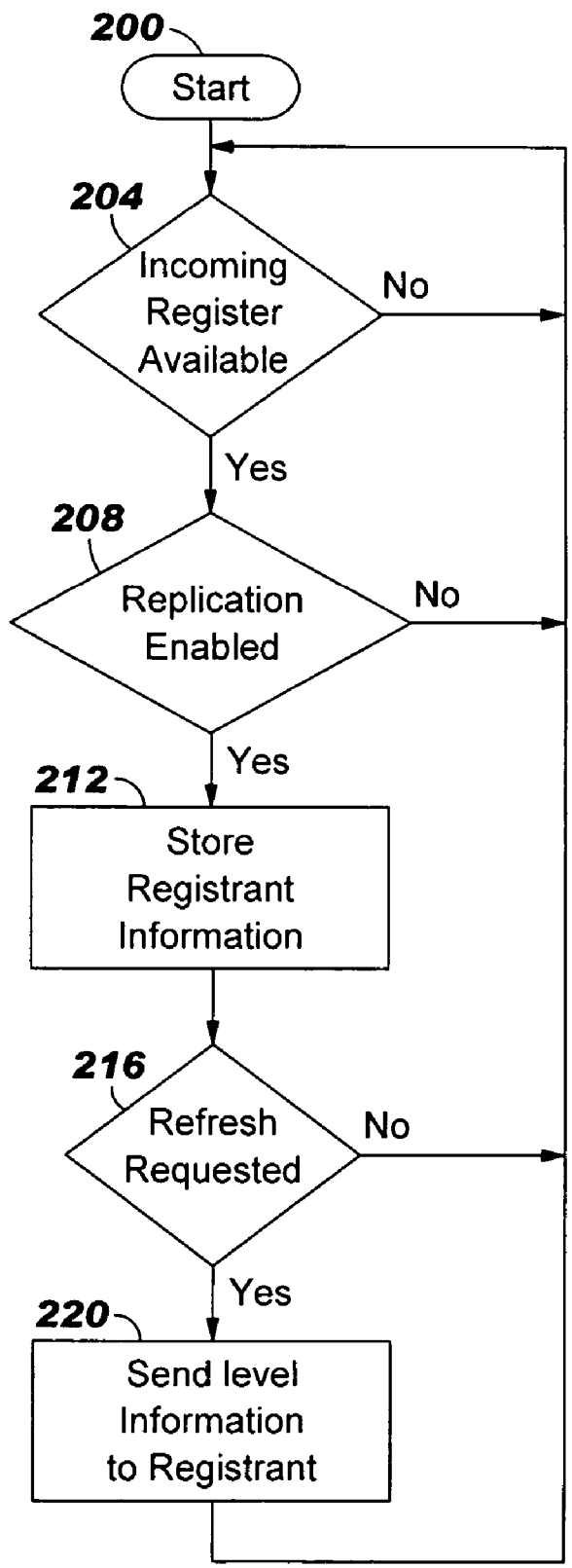
FIG. 4 is a flow chart illustrating the processing by each donor console when receiving the registration request of FIG. 3.

FIG. 4 is a flow chart illustrating the processing by each donor console when receiving the registration request generated in step 116. In step 200, the parameter replication donor program 44 is started, and determines whether it has received any registration requests (decision 204). These can be detected via interrupt or by periodic reading of an input buffer. If a registration request has been received, the parameter replication donor program determines if replication has been enabled at the donor console (step 208). The donor console includes a configuration file for replication. The configuration file includes an indication whether replication has been enabled for the donor console and the donor table (such as Tables D, E or F) which indicates which recipient consoles are registered for update of which parameters. The contents of the donor table is built dynamically based on information provided by recipient consoles during registration. If the replication service is enabled for the donor console, then the parameter replication donor program 44 records the parameter and level information, if any, contained in the current registration request (step 212). Next, the parameter update donor program determines if the register request includes a refresh option (decision 216). If so, the parameter update donor program sends "level" information to the registering recipient console, i.e. specification as to the current version or revision level of each parameter stored at the donor console for which the recipient console has registered for update (step 220). If the recipient console did not specify any parameters in the registration request, then the donor console will send the level information for all of its parameters for which replication can be specified The level information for a specific type of replication parameter uniquely defines the level of the data. It can include, but is not limited to, change count, time stamp of last change, size of the actual parameter, and CRC of the actual parameter.

Figure 5:
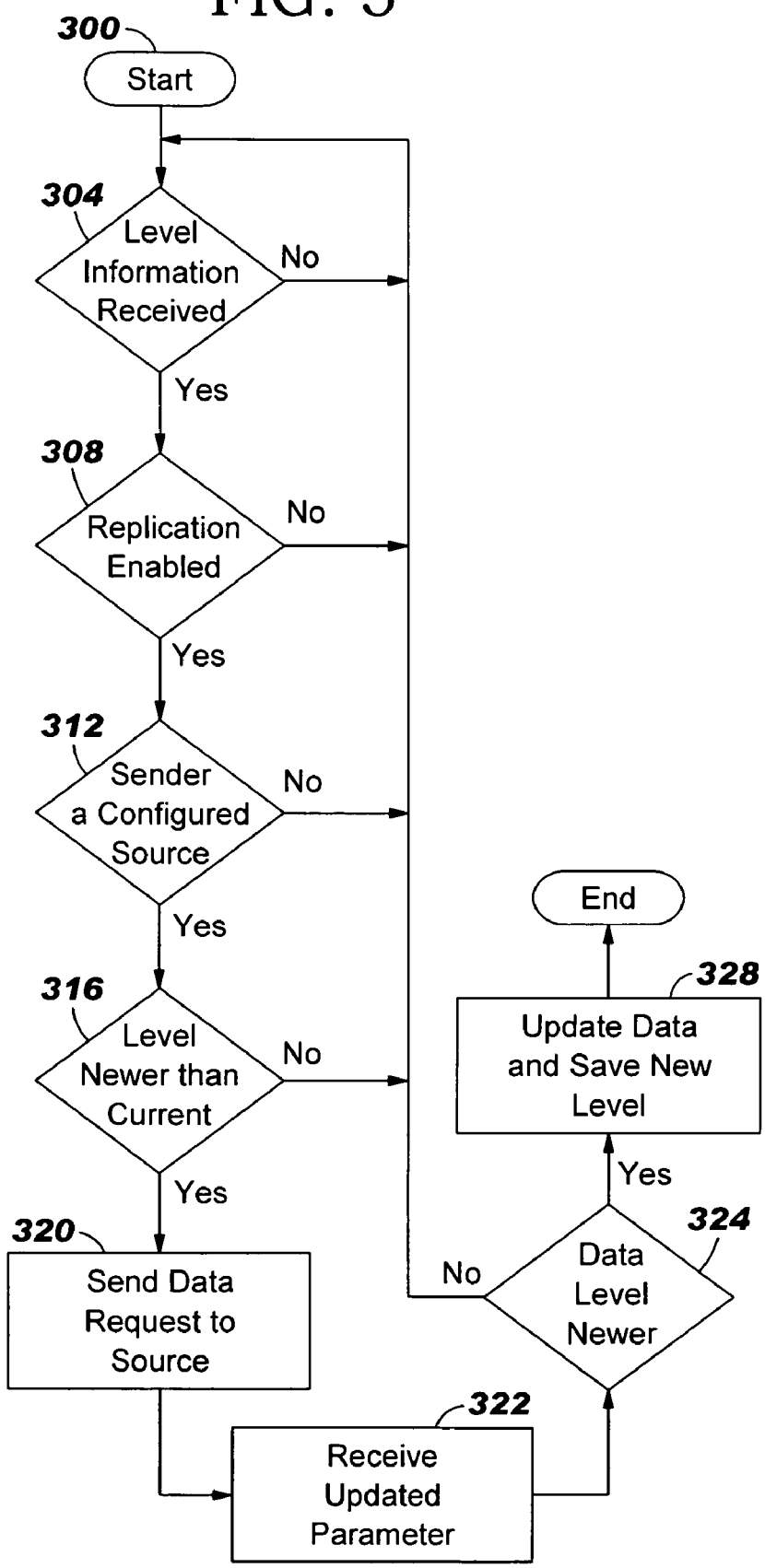
FIG. 5 is a flow chart illustrating a function of a parameter replication recipient program within a recipient console of FIG. 1 in requesting and processing parameter level information from the donor console.

FIG. 5 is a flow chart illustrating the function of each parameter replication recipient program in processing the level information from its donor console and determining whether the donor console has a more recent level of a parameter. In such a case, the parameter replication recipient program will typically request replication of the more recent parameter(s) from the donor console. In step 300, the parameter replication recipient program starts. Next, the parameter replication recipient program determines if the recipient console has received level information from a donor console, either by interrupt or by periodically reading an input buffer (step 304). Then, the parameter replication recipient program determines from the configuration file of its console if the data replication service is enabled at its console (decision 308). If so, the parameter replication recipient program processes the level information received from the donor console as follows. The parameter replication recipient program determines if the level information was sent from a console that is configured in the recipient console as a donor of a parameter update (decision 312). If so, then the parameter replication recipient function determines if any of the level information is for a parameter for which the recipient console is interested in replication and is a more recent level than the parameter data currently stored in the recipient console's configuration file (step 316). If both requirements are met (decision 316, yes branch), then the parameter update recipient program generates and sends a request to the donor console for an update to the parameter(s) in the recipient console's configuration file specified to be received from this donor console (step 320). Sometime later, the recipient console will receive the updated parameter(s) and the respective level information(s) from the donor console (step 322). Then, the parameter replication recipient program compares the level information returned with the actual updated parameter to ensure that the actual updated parameter is still more current than that found in the recipient console's configuration file (decision 324). If so, the parameter replication recipient program saves the parameter value (s) received from the donor console along with the associated level information and updates its configuration file accordingly (step 328).

Figure 6:
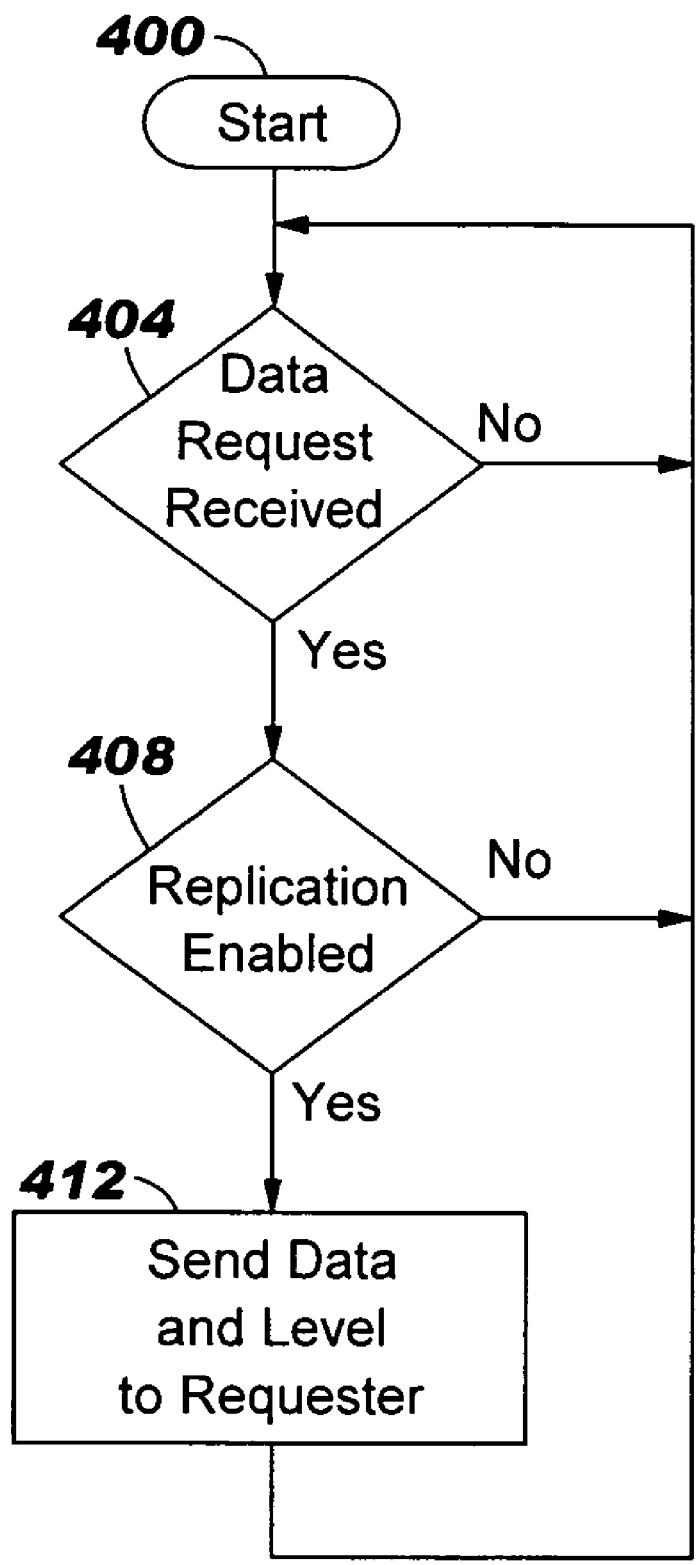
FIG. 6 is a flow chart illustrating processing by a donor console of FIG. 1 in response to a request made by a recipient console in FIG. 5 for parameter level information.

FIG. 6 is a flow chart illustrating processing by each donor console in response to a request made by a recipient console in step 320 of FIG. 5. In step 400, the parameter replication donor program is started. Then, the parameter replication donor program determines if it has received a request for a parameter update, either by an interrupt or periodically checking an input buffer (decision 404). If so, the parameter replication donor program determines from its configuration file if the data replication service is enabled (decision 408). If so, the parameter update donor program sends the requested type(s) of parameter data to the requesting recipient console and includes the level information for each of these types of parameter(s) in the response (step 412). This information is received by the recipient console in step 322 of FIG. 5.

Figure 7:
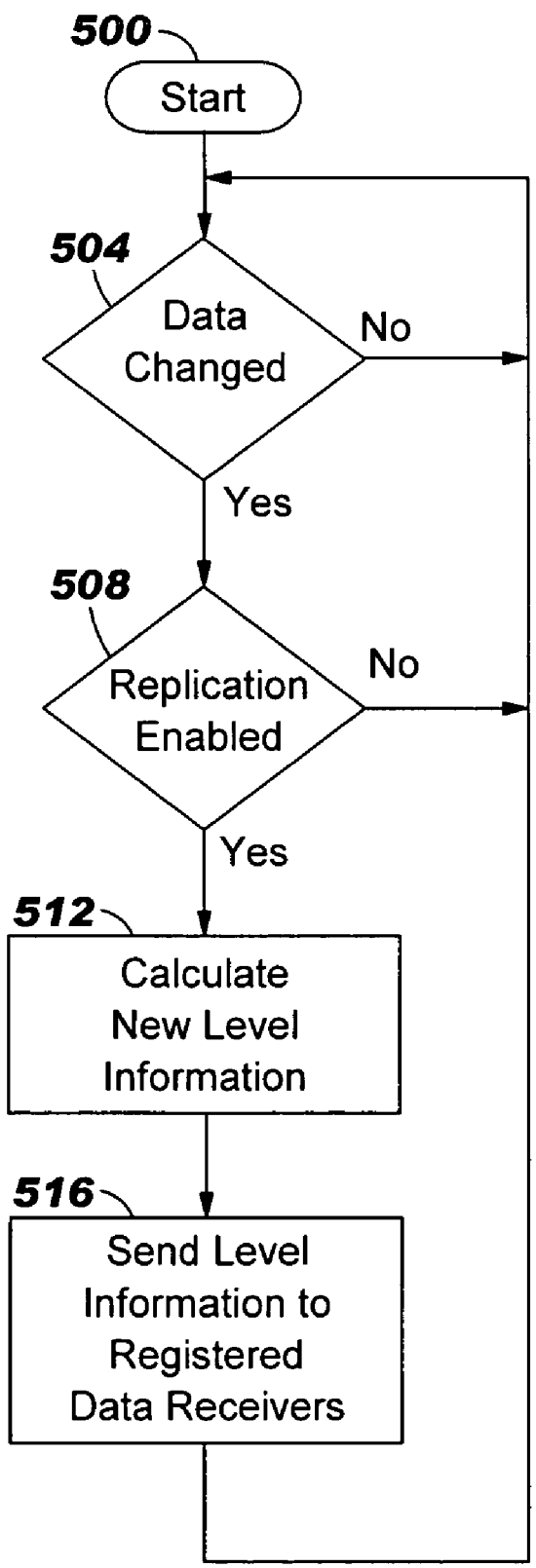
FIG. 7 is a flow chart illustrating processing by a parameter replication donor program to notify its recipient consoles of FIG. 1 when there has been a change in the level of a parameter for which a recipient console has registered for updates.

FIG. 7 is a flow chart illustrating processing by the parameter replication donor program within each donor console to notify its recipient consoles when there has been a change in the level of a parameter for which a recipient console has registered for updates. In the illustrated embodiment, this notification occurs after registration without a specific request by the recipient console for an update to a parameter. In step 500, the parameter replication donor program is started. Then, the parameter replication donor program determines if any types of replication parameters have been changed since the last determination (decision 504). This determination is made by checking with a record maintained at the donor console. The record is updated each time a change is made to one of the parameters. If any of the replication parameters have changed since the last iteration (decision 504, yes branch), the parameter replication donor program determines if the data replication service is enabled (decision 508). If so, then the parameter replication donor program calculates the new level information for the changed type(s) of parameter data and stores the new level information in the donor's configuration file (step 512). This calculation can include, but is not limited to, incrementing a change count, setting a time stamp for the last change, and/or calculating a CRC for the newly changed parameter. Then, the parameter replication donor program sends the new level information to the registered recipient consoles who have registered for updates to this changed parameter (step 516). In the example illustrated by the Tables A-F above, the level of the donor parameters, help desk phone # and grouping of servers, in donor console 14 is more recent than that of its recipient consoles 12, 13 and 15, and was presumably updated since the last level check at the donor console. So, according to the present invention, donor console 14 will notify its (registered) recipient consoles 12, 13 and 14 of the availability of the update to these parameters, and thereby invite consoles 12, 13 and 14 to request the latest level of these parameters from donor console 12. In the example illustrated by the Tables A-F, the level of the donor parameters, default settings and help desk phone #, in donor consoles 13 and 15 are the same as in their respective recipient consoles. Most likely, the respective recipient consoles received these parameter values previously from the donor consoles 13 and 15. In such a case, the donor consoles 13 and 15 would not ordinarily notify the recipient consoles again of these parameters until they are updated.

As for recipient consoles who have registered with the donor console but have not registered for any specific type of parameter updates, there are two embodiments of the present invention. In one embodiment, the donor console will notify this recipient console of an update to any parameter for which replication is supported by the donor console. In another embodiment of the present invention, the donor console will not notify this recipient console of an update to any parameter for which this recipient console has not specifically requested notification of updates. In the preferred embodiment of the present invention, the other consoles, if any, do not receive notification of the change to the parameter because they have not registered for such notification. In response to the notification to the registered recipient console(s), the recipient consoles who receive this new level information will process this level information according to the steps of FIG. 5 beginning with decision 304, as described above. Thus, the registered recipient consoles will receive, from one or more donor consoles, notification of changes to parameters for which they are registered, and will ordinarily request and store the actual, changed parameter if the registered recipient console does not already have the changed parameter.

Based on the foregoing, a system, method and program for selectively updating parameters at a console have been disclosed. However, numerous modifications and substitutions can be made without deviating from the scope of the present invention. For example, during registration, each recipient console could provide the current level information, if any, for the parameters to be replicated. The donor console could then use this information to decide if the donor console should notify the recipient console about the level information of the donor console's parameters. Therefore, the present invention has been disclosed by way of illustration and not limitation, and reference should be made to the following claims to determine the scope of the present invention.

The invention claimed is:

1. A method for updating first and second parameters of a recipient server control console from first and second donor server control consoles, said method comprising the steps of:

providing said recipient server control console having a server control software installed thereon for controlling control functions of one or more respective servers coupled to and controlled by said recipient server control console, said recipient server control console including a parameter replication program for selecting a first parameter and a second parameter of said recipient server control console to be updated, providing a first donor server control console having said server control software installed thereon for controlling a first group of respective servers coupled to said first donor server control console, said first donor server control console including said parameter replication program for providing updates to said first parameter selected by said recipient server control console and providing a second donor server control console having said server control software installed thereon for controlling a second group of respective servers coupled to said second donor server control console, said second donor server control console including said parameter replication program for providing updates to said second parameter selected by said recipient server control console, wherein said parameter replication program installed on each of said recipient server control console, said first donor server control console and said second donor server control console includes a parameter replication recipient program and a parameter replication donor program;

identifying said first donor server control console for updating said first parameter selected by said recipient server control console and identifying said second donor server control console for updating said second parameter selected by said recipient server control console;

said recipient server control console registering with said first donor server control console to receive notification when said first donor server control console has a first parameter update to said first parameter;

said recipient server control console registering with said second donor server control console to receive notification when said second donor server control console has a second parameter update to said second parameter;

after the step of registering said recipient server control console with said first donor server control console, said recipient server control console receiving said notification from said first donor server control console and updating said first parameter received from said first donor server control console accordingly; and after the step of registering said recipient server control console with said second donor server control console, said recipient server control console receiving said notification from said second donor server control console and updating said second parameter received from said second donor server control console accordingly.

2. A method as set forth in claim 1, further comprising:

a second recipient server control console which registers with said first donor server control console to receive notification when said first donor server control console has said first parameter update to said first parameter, after the step of registering said second recipient server control console with said first donor server control console, said second recipient server control console receiving said notification from said first donor server control console and updating said first parameter received from said first donor server control console accordingly.

3. A method as set forth in claim 1, wherein said first parameter selected by said recipient server control console comprises at least one of: a user ID, an authorization for said user ID, a password of a server operator, a grouping of servers managed by a server control console, an account information, a default settings for displays, a help desk telephone number for a server control console operator, a language designation for text displayed on a screen, an IP address of a server control console, an IP address of a server managed by said server control console, and wherein said second parameter selected by said recipient server control console comprises at least one of: a user ID, an authorization for said user ID, a password of a server operator, a grouping of servers managed by a server control console, an account information, a default settings for displays, a help desk telephone number for a server control console operator, a language designation for text displayed on a screen, an IP address of a server control console, an IP address of a server managed by said server control console; and wherein said first parameter selected by said recipient server control console is different than said second parameter selected by said recipient server control console.

4. A method as set forth in claim 3, further comprising the steps of:
said recipient server control console requesting said first parameter update to said first parameter from said first donor server control console after the step of said recipient server control console receiving said notification from said first donor server control console of said first parameter update to said first parameter, and before the step of said recipient server control console updating said first parameter received from said first donor server control console accordingly; and
said recipient server control console requesting said second parameter update to said second parameter from said second donor server control console after the step of said recipient server control console receiving said notification from said second donor server control console of said second parameter update to said second parameter, and before the step of said recipient server control console updating said second parameter received from said second donor server control console accordingly.

5. A computer program product for updating a first parameter and a second parameter of a recipient server control console from a first donor server control console and a second donor server control console, said computer program product comprising:
a computer readable storage medium;
first program instructions to instruct said recipient server control console to register with said first donor server control console to receive notification when said first donor server control console has a first parameter update to said first parameter selected by said recipient server control console, wherein said recipient server control console has installed thereon a server control software for controlling functions of one or more respective servers coupled to said recipient server control console, wherein said recipient server control console has installed thereon a parameter replication program for selecting said first parameter and said second parameter to be updated, wherein said first donor server control console has installed thereon said server control software for controlling functions of a first group of respective servers coupled to said first donor server control console, and wherein said first donor server control console has installed thereon said parameter replication program for selecting said first parameter to be updated;
second program instructions to instruct said recipient server control console to register with said second donor server control console to receive notification when said second donor server control console has a second parameter update to said second parameter selected by said recipient server control console, wherein said second donor server control console has installed thereon said server control software for controlling functions of a second group of respective servers coupled to said second donor server control console, and wherein said second donor server control console has installed thereon said parameter replication program for selecting said second parameter to be updated;
third program instructions, executed after said first program instructions register said recipient server control console with said first donor server control console, to instruct said recipient server control console to receive said notification from said first donor server control console and to update said first parameter received from said first donor server control console accordingly; and
fourth program instructions, executed after said second program instructions registers said recipient server control console with said second donor server control console, to instruct said recipient server control console to receive said notification from said second donor server control console and to update said second parameter received from said second donor server control console accordingly; wherein said first parameter selected by said recipient server control software comprises at least one of: a user ID, an authorization for said user ID, a password of a server operator, a grouping of servers managed by a server control console, an account information, a default settings for displays, a help desk telephone number for a server control console operator, a language designation for text displayed on a screen, an IP address of a server control console, an IP address of a server managed by said server control console; wherein said second parameter selected by said recipient server control software comprises at least one of: a user ID, an authorization for said user ID, a password of a server operator, a grouping of servers managed by a server control console, an account information, a default settings for displays, a help desk telephone number for a server control console operator, a language designation for text displayed on a screen, an IP address of a server control console, an IP address of a server managed by said server control console; wherein said first parameter selected by said recipient server control console is different than said second parameter selected by said recipient server control console, and wherein said first, second, third and fourth program instructions are recorded on said storage medium for execution by a computer system for updating said first and second parameters of said recipient server control console.

6. A method for updating a first parameter and a second parameter of a recipient server control console from a first donor server control console and a second donor server control console, said method comprising the steps of:
providing said recipient server control console having a server control software installed thereon for controlling control functions of one or more respective servers coupled to and controlled by said recipient server control console, said recipient server control console including a parameter replication program for selecting a first parameter and a second parameter of said recipient server control console to be updated, providing a first donor server control console having said server control software installed thereon for controlling a first group of respective servers coupled to said first donor server control console, said first donor server control console including said parameter replication program for providing updates to said first parameter selected by said recipient server control console and providing a second donor server control console having said server control software installed thereon for controlling a second group of respective servers coupled to said second donor server control console, said second donor server control console including said parameter replication program for providing updates to said second parameter selected by said recipient server control console, wherein said parameter replication program installed on each of said recipient server control console, said first donor server control console and said second donor server control console includes a parameter replication recipient program and a parameter replication donor program;

identifying said first donor server control console for updating said first parameter selected by said recipient server control console and identifying said second donor server control console for updating said second parameter selected by said recipient server control console;

said recipient server control console registering with said first donor server control console to receive notification when said first donor server control console has a first parameter update to said first parameter;

said recipient server control console registering with said second donor server control console to receive notification when said second donor server control console has an a second parameter update to said second parameter;

after the step of said recipient server control console registering with said first donor server control console, said first donor server control console notifying said recipient server control console of said first parameter update of said first parameter and sending said first parameter update to said first parameter to said recipient server control console; and after the step of said recipient server control console registering with said second donor server control console, said second donor server control console notifying said recipient server control console of said second parameter update to said second parameter and sending said second parameter update of said second parameter to said recipient server control console.

* * * * *